May 1, 1945. M. C. WADDELL 2,375,054
MANUFACTURE OF TRISODIUM PHOSPHATE
Filed Sept. 19, 1941
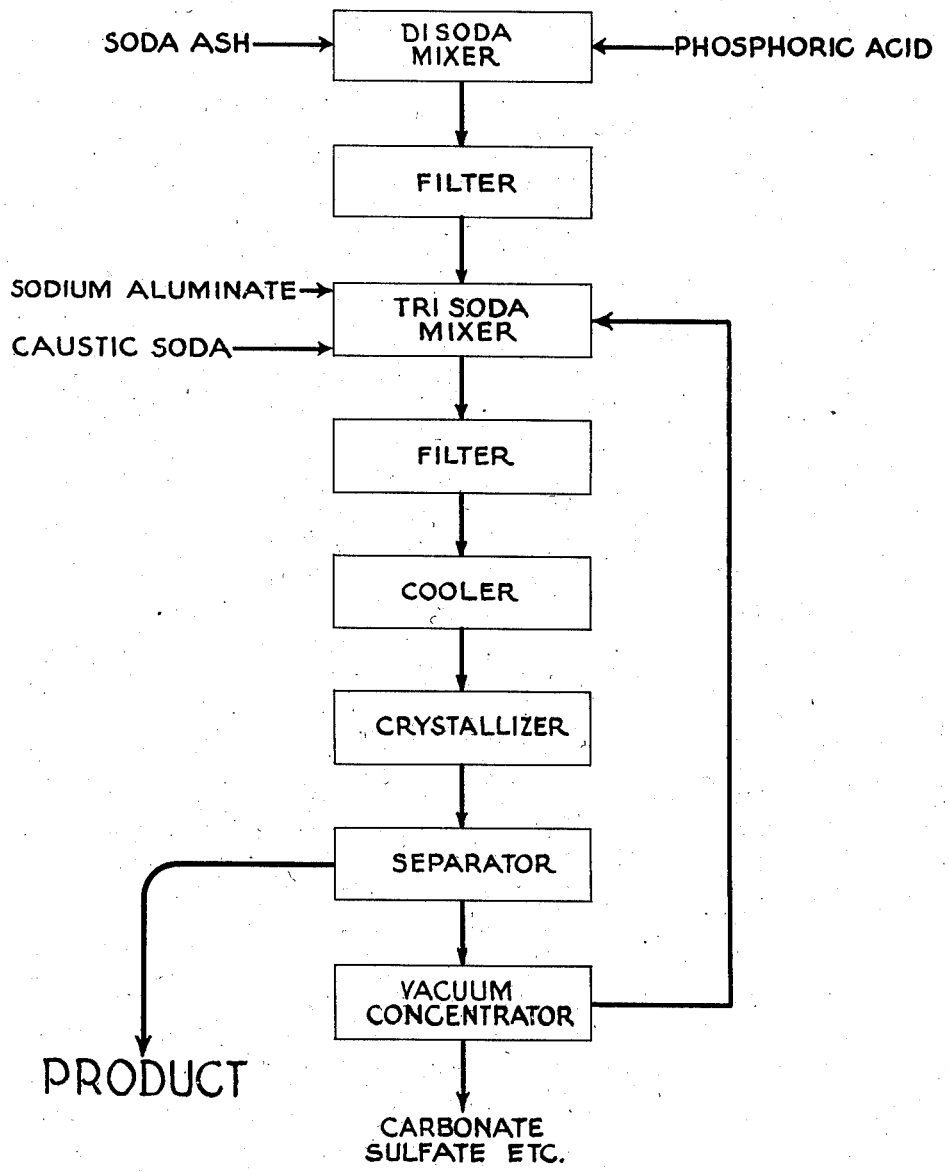

Patented May 1, 1945

2,375,054

UNITED STATES PATENT OFFICE 2,375,054

MANUFACTURE OF TRISODIUM PHOSPHATE

Myron C. Waddell, Lakewood, Ohio, assignor to E. I. du Pont de Nemours & Company, Wilmington, Del., a corporation of Delaware Application September 19, 1941, Serial No. 411,463

7 Claims. (Cl. 23—107)

This invention relates to the manufacture of trisodium phosphate, and is directed particularly to cyclic processes of crystallizing trisodium phosphate in which the soluble silica content which tends to build up to undesired levels due to the cyclic nature of the process is kept at a low level by treatment with sodium aluminate.

In the production of trisodium phosphate from phosphoric acid obtained by the digestion of phosphate rock with sulfuric acid, soluble compounds of silica are carried through the successive stages of neutralization, and finally in small quantities, into the trisodium phosphate crystallizing system. Here the quantity of such soluble silica compounds tends to build up if the mother liquor is recycled, and to become so great as to interfere with the proper crystallization of the trisodium phosphate.

I have now found that this cyclic build up of soluble silica can be avoided by treating the trisodium phosphate likuor in the crystallizing circuit with sodium aluminate in the amount and as often as required to keep the soluble silica at a suitable level. I have found that best results and greatest economy can be obtained if the soluble silica content is levelled off somewhere within the limits of 0.06 to 0.17% soluble silica calculated as $SiO_2$.

The process may be more fully understood by referring to the accompanying flow sheet. Phosphoric acid obtained by digestion of phosphate rock with sulfuric acid or by any other method introducing soluble compounds of silica is converted to disodium phosphate liquor by the addition of soda ash according to any of the usual methods commonly known or available to the art. I have illustrated a simple disoda mixer such as shown in the Industrial and Engineering Chemistry, vol. 23, No. 5, May 1931, pages 470–474. But it will be understood that various other processes are available and various intervening steps may be used in the production of the disoda liquor.

Disodium phosphate liquor such as I have described is run into a trisoda mixer where it is reacted with caustic soda, which may also be a source of the contaminating soluble silica, to the trisodium phosphate stage. Mother liquor from a previous crystallization is also added and conditions are adjusted so that the trisoda liquor there produced contains about 50% trisodium phosphate dodecahydrate. Sodium aluminate is also added in order to precipitate the soluble silica. The trisodium phosphate liquor thus obtained is filtered, cooled and subjected to crystallization. The crystals are separated out and the mother liquor concentrated to throw out sulfate and carbonates and returned to the trisoda mixer.

In a typical operation the disoda liquor fed to the trisoda mixer contains 12.4% $P_2O_5$ and 0.03% soluble silica calculated as $SiO_2$; the trisoda liquor after being filtered contains 9.9% $P_2O_5$ (53.0% trisodium phosphate dodecahydrate), 0.12% soluble silica calculated as $SiO_2$ and 1 to 2% excess caustic soda; and the mother liquor, after being concentrated, contains 11.2% $P_2O_5$ (60.0% trisodium phosphate dodecahydrate), and 0.45% soluble silica calculated as $SiO_2$. Under these circumstances five pounds of sodium aluminate for every 40,000 pounds of liquor treated is sufficient to keep the crystallizing liquor at about 0.12% soluble silica.

While I have disclosed my invention with reference to a particular process it will be understood that variations may be made without departing from the spirit and scope of the invention, and I may vary the proportions, concentrations, sequence and particular mode of operation widely, as long as sodium aluminate is introduced into the cyclic part of the process and the precipitate separated prior to the crystallization so as to keep the content of soluble silica at a suitable level.

While I have specifically referred to the addition of sodium aluminate it is to be understood that precipitation of an insoluble sodium aluminum silicate can be accomplished by the addition of other soluble aluminum compounds, and that any compound which will release sufficient concentration of aluminum ions in the alkaline solution may be used. As a matter of fact any such compounds introduced into the alkaline trisodium phosphate liquor automatically form sodium aluminate since the hydroxide formed is redissolved as sodium aluminate. Consequently, when I speak of incorporating sodium aluminate into the trisoda liquor, it will be understood that I need not add the sodium aluminate as such. The addition of sodium aluminate, however, has the specific advantage that it does not introduce foreign materials, such as would be introduced if aluminum sulphate and like soluble aluminum salts were employed.

I prefer that the amount of sodium aluminate be so regulated as to keep the soluble silica content within the limits of 0.06 to 0.17% soluble silica calculated as $SiO_2$. Other proportions consistent with the purposes of the invention may be used, but in general it will be found that crystallization is not so satisfactory or the amount of the aluminate required is excessive. Considerable variation may likewise be made in the strength of the crystallizing liquor, and I do not wish to be limited in this respect, but for most purposes crystallization from a liquor containing 40 to 60% trisodium phosphate dodecahydrate will be suitable. The aluminate may be added to the crystallizing liquor or to the concentrated mother liquor, with or without separate filtration. These and other variations may be made without departing from the spirit and scope of the invention.

I claim:

1. In a cyclic process for crystallizing trisodium phosphate dodecahydrate in which the content of soluble silica compound tends to build up to undesirable levels due to recirculation of mother liquor the steps of precipitating the soluble silica by incorporating sodium aluminate in the contaminated liquor and filtering off the precipitate prior to crystallization of the trisodium phosphate dodecahydrate.

2. In a cyclic process for crystallizing trisodium phosphate dodecahydrate in which the content of soluble silica compound tends to build up to undesired levels due to the recirculation of mother liquor, the steps of precipitating soluble silica compounds by the addition of sodium aluminate to the contaminated liquor and filtering the thus treated liquor prior to crystallizing out trisodium phosphate dodecahydrate.

3. In a cyclic process for crystallizing trisodium phosphate dodecahydrate in which the content of soluble silica compounds tends to build up due to recirculation of mother liquor the steps of preparing a liquor of crystallizing strength, incorporating therein sodium aluminate as required to keep the content of soluble silica compound within the limits of 0.06 to 0.17% soluble silica calculated as $SiO_2$, treating the liquor to remove the precipitate, treating it to induce crystallization of trisodium phosphate dodecahydrate, isolating the crystals thus formed and recycling the mother liquor.

4. In a cyclic process for crystallizing trisodium phosphate dodecahydrate in which the content of soluble silica compound tends to build up to undesired levels due to the recirculation of mother liquor the steps of preparing a liquor containing approximately 50% trisodium phosphate dodecahydrate, adding sodium aluminate thereto as required to keep the content of soluble silica compound within the limits of 0.06 to 0.17% calculated as $SiO_2$ filtering off the precipitate, treating the liquor to induce crystallization of trisodium phosphate dodecahydrate, isolating the crystals thus formed and recycling the mother liquor.

5. In a process for producing crystal trisodium phosphate dodecahydrate, the steps of preparing a trisodium phosphate liquor by mixing disodium phosphate liquor containing soluble silica compound, recycled mother liquor from a previous crystallization containing an undesirably large content of soluble silica compound and caustic soda in such proportions and in such concentrations as provide trisodium phosphate liquor containing approximately 50% trisodium phosphate dodecahydrate, crystallizing and separating out trisodium phosphate dodecahydrate in the presence of added sodium aluminate, said sodium aluminate having been added to the contaminated liquor as require to keep the content of soluble silica within the limits of 0.06 to 0.17% calculated as $SiO_2$ and filtering the trisodium phosphate liquor prior to subjecting it to crystallization.

6. In a process for producing crystal trisodium phosphate dodecahydrate, the steps of preparing a trisodium phosphate liquor by mixing disodium phosphate liquor containing soluble silica compound, recycled mother liquor from a previous crystallization containing an undesirably large content of soluble silica compound and caustic soda in such proportions and in such concentrations as to provide trisodium phosphate liquor containing approximately 50% trisodium phosphate dodecahydrate, precipitating silica compound by adding sodium aluminate as required to keep the content of soluble silica within the limits of 0.06 to 0.17% calculated as $SiO_2$ separating out the precipitated silica compound and then crystallizing and separating out trisodium phosphate dodecahydrate.

7. In a cyclic process for crystallizing trisodium phosphate dodecahydrate in which the content of soluble silica compound tends to build up to undesirable levels due to recirculation of mother liquor, the steps of removing soluble silica by precipitating silica compound by adding sodium aluminate, filtering off the precipitate and then crystallizing out trisodium phosphate dodecahydrate.

MYRON C. WADDELL.